United States Patent
Shimura

(10) Patent No.: US 11,739,231 B2
(45) Date of Patent: Aug. 29, 2023

(54) PRINTING TREATMENT LIQUID COMPOSITION, INK JET PRINTING INK SET, PRINTING METHOD, AND INK JET PRINTING METHOD

(71) Applicant: Seiko Epson Corporation, Tokyo (JP)

(72) Inventor: Kazuki Shimura, Shiojiri (JP)

(73) Assignee: SEIKO EPSON CORPORATION

( * ) Notice: Subject to any disclaimer, the term of this patent is extended or adjusted under 35 U.S.C. 154(b) by 100 days.

(21) Appl. No.: 17/515,679

(22) Filed: Nov. 1, 2021

(65) Prior Publication Data

US 2022/0135820 A1 May 5, 2022

(30) Foreign Application Priority Data

Nov. 2, 2020 (JP) ................. 2020-183533

(51) Int. Cl.
*C09D 11/328* (2014.01)
*C09D 11/54* (2014.01)
(Continued)

(52) U.S. Cl.
CPC ............. *C09D 11/328* (2013.01); *B41J 2/01* (2013.01); *B41J 2/2107* (2013.01); *B41J 2/2114* (2013.01);
(Continued)

(58) Field of Classification Search
CPC ....... C09D 11/328; C09D 11/38; C09D 11/40; C09D 11/54; C09D 11/101; C09D 11/322; C09D 175/04; C09D 11/36; C09D 11/30; C09D 11/32; C09D 11/324; C09D 11/102; C09D 11/005; C09D 11/52; C09D 11/106; B41J 2/01; B41J 2/2107; B41J 2/2114; B41J 2/211; B41J 2/1433; B41J 2/17; B41J 2/17593; B41J 2/1755; B41J 2/2117; B41J 2/2056; B41J 2/21; B41J 2/0057; B41J 3/60; B41J 2002/012; B41J 2/04598; B41J 2/04588; B41J 2/04595; B41J 2/04586;
(Continued)

(56) References Cited

U.S. PATENT DOCUMENTS

2011/0057993 A1* 3/2011 Yamashita ............. C09D 11/54
427/256
2015/0051324 A1* 2/2015 Nonokawa ............... C08J 3/201
524/89
(Continued)

FOREIGN PATENT DOCUMENTS

JP 2001-123373 A 5/2001

*Primary Examiner* — Manish S Shah
(74) *Attorney, Agent, or Firm* — Harness, Dickey & Pierce, P.L.C.

(57) ABSTRACT

A printing treatment liquid composition which is to be adhered to a cloth, includes: a compound including a polyvalent carbodiimide group which has a carbodiimide group equivalent of 500 g/mol or less; and an aromatic carboxylic acid and/or its salt. According to the printing treatment liquid composition described above, a content of the compound including a polyvalent carbodiimide group with respect to a total mass of the treatment liquid composition is 1.0 to 35.0 percent by mass, a content of the aromatic carboxylic acid and/or its salt with respect to the total mass of the treatment liquid composition is 0.1 to 30.0 percent by mass, and the cloth contains fibers having hydroxy groups.

10 Claims, 1 Drawing Sheet

(51) Int. Cl.
*D06P 5/28* (2006.01)
*D06P 5/22* (2006.01)
*D06P 5/30* (2006.01)
*C09D 11/38* (2014.01)
*C09D 11/40* (2014.01)
*B41J 2/21* (2006.01)
*B41J 2/01* (2006.01)

(52) U.S. Cl.
CPC .............. *C09D 11/38* (2013.01); *C09D 11/40* (2013.01); *C09D 11/54* (2013.01); *D06P 5/006* (2013.01); *D06P 5/22* (2013.01); *D06P 5/30* (2013.01)

(58) Field of Classification Search
CPC .. B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; D06P 5/006; D06P 5/22; D06P 5/30; D06P 1/6493; D06P 1/6533; D06P 3/58; D06P 3/60; D06P 1/6536; D06P 5/001; D06P 5/002; D06P 5/005; D06P 1/44; D06P 5/2005; D06P 1/5285; D06P 3/32; B41M 5/0076; B41M 3/14; B41M 5/00; B41M 5/0047; B41M 2205/40; B41M 5/0011; B41M 5/0017; B41M 5/0023; B41M 7/00; B41M 7/0072; B41M 5/52; B41M 5/5218; B41M 5/5227; C08G 18/73; C14B 1/56; C14C 1/00

See application file for complete search history.

(56) References Cited

U.S. PATENT DOCUMENTS

| | | | |
|---|---|---|---|
| 2015/0299948 A1* | 10/2015 | Pan | B41M 5/0017 524/591 |
| 2018/0094380 A1* | 4/2018 | Yagi | D06P 1/6493 |
| 2019/0003115 A1* | 1/2019 | Ohashi | B41J 11/0015 |
| 2022/0315787 A1* | 10/2022 | Shimura | B41M 5/0023 |

* cited by examiner

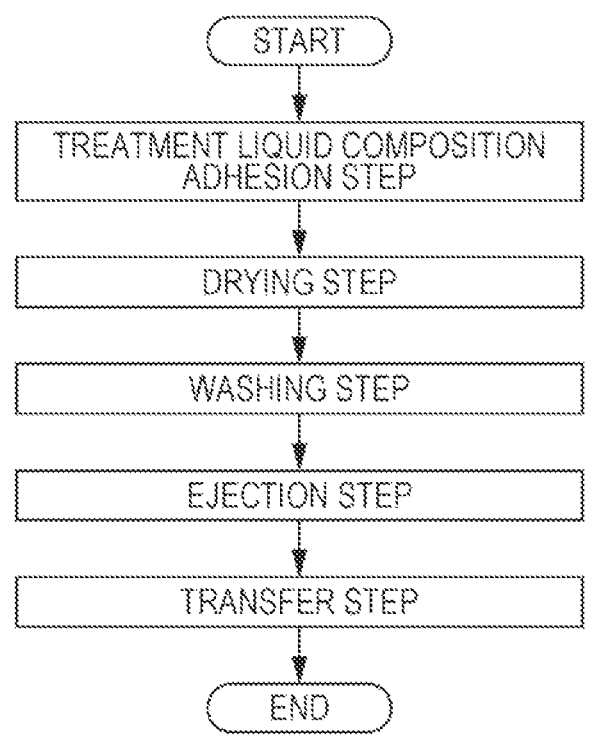

PRINTING TREATMENT LIQUID COMPOSITION, INK JET PRINTING INK SET, PRINTING METHOD, AND INK JET PRINTING METHOD

The present application is based on, and claims priority from JP Application Serial Number 2020-183533, filed Nov. 2, 2020, the disclosure of which is hereby incorporated by reference herein in its entirety.

BACKGROUND

1. Technical Field

The present disclosure relates to a printing treatment liquid composition, an ink jet printing ink set, a printing method, and an ink jet printing method.

2. Related Art

Heretofore, when a printed matter is manufactured by dyeing a cloth with a colorant, in order to improve a color development property of the colorant, a technique which performs a pre-treatment on the cloth using a treatment liquid has been known. As the technique described above, for example, Japanese Patent No. 4446361 has disclosed a technique in which after an alkaline aqueous solution is applied to a cloth formed of cellulose fibers, a nonaqueous solution containing benzoyl chloride is applied thereto so as to improve the color development property by modification of the cellulose fibers.

However, there has been a problem in that a sufficient color development property is difficult to obtain by a related technique.

SUMMARY

According to an aspect of the present disclosure, there is provided a printing treatment liquid composition which is to be adhered to a cloth, the composition comprising: a compound including a polyvalent carbodiimide group which has a carbodiimide group equivalent of 500 g/mol or less; and an aromatic carboxylic acid and/or its salt. According to the printing treatment liquid composition described above, a content of the compound including a polyvalent carbodiimide group with respect to a total mass of the treatment liquid composition is 1.0 to 35.0 percent by mass, a content of the aromatic carboxylic acid and/or its salt with respect to the total mass of the treatment liquid composition is 0.1 to 30.0 percent by mass, and the cloth contains fibers having hydroxy groups.

BRIEF DESCRIPTION OF THE DRAWINGS

FIG. 1 is a flowchart showing one example of an indirect printing recording method according to this embodiment.

DESCRIPTION OF EXEMPLARY EMBODIMENTS

Hereinafter, although an embodiment (hereinafter, referred to as "this embodiment") of the present disclosure will be described in detail, the present disclosure is not limited thereto and may be variously changed and/or modified without departing from the scope of the present disclosure.

1. Printing Treatment Liquid Composition

A printing treatment liquid composition (hereinafter, referred to as "treatment liquid composition" is some cases) of the present disclosure is used before printing so as to be adhered to a cloth containing fibers which have hydroxy groups. The treatment liquid composition includes: a compound including a polyvalent carbodiimide group which has a carbodiimide group equivalent of 500 g/mol or less; and an aromatic carboxylic acid and/or its salt. According to the treatment liquid composition described above, a content of the compound including a polyvalent carbodiimide group with respect to a total mass of the treatment liquid composition is 1.0 to 35.0 percent by mass, and a content of the aromatic carboxylic acid and/or its salt with respect to the total mass of the treatment liquid composition is 0.1 to 30.0 percent by mass.

In the technique disclosed in Japanese Patent No. 4446361, since the alkaline treatment is performed, sufficient color development property and fastness are disadvantageously difficult to obtain. In addition, in order to modify the cellulose fibers, at least two steps are necessarily performed, and as a result, this complicated process is disadvantageous. Furthermore, since a high concentration alkaline solution and a nonaqueous solution containing relatively toxic benzoyl chloride are used, a load on the environment is high, and a safety problem still remains.

According to this embodiment, since the treatment liquid composition is adhered in advance to the cloth containing the fibers which have hydroxy groups, and printing is performed on the cloth to which the treatment liquid composition is adhered, a printed matter having a sufficient color development property and a sufficient fastness, such as abrasion resistance and water resistance, can be easily obtained. In addition, the components contained in the treatment liquid composition have a high safety and a low load on the environment.

Although the reason the excellent effect is obtained by this embodiment as described above has not been clearly understood, the present inventors believe as described below. That is, in general, since an ink containing a disperse dye or the like to be used for printing has a low affinity to a cloth containing fibers, such as cotton fibers, which have hydroxy groups, the printing is not likely to be performed on the cloth. However, in the treatment liquid composition described above, since the compound including a polyvalent carbodiimide group which has a carbodiimide group equivalent of 500 g/mol or less reacts with the aromatic carboxylic acid and/or its salt together with the hydroxy groups in the fibers, while the fastness of the cloth is maintained, the ink is adsorbed to the aromatic ring of the aromatic carboxylic acid and/or its salt and can be aggregated in the cloth. Hence, it is estimated that since a dyeing property of the ink can be imparted to the fibers, such as cotton fibers, having hydroxy groups, a printed matter having sufficient color development property and fastness can be obtained. In addition, since the components contained in the treatment liquid composition according to this embodiment are relatively harmless, the safety is high, and the environmental load is low. However, the reason is not limited to that described above.

Next, the components contained in the treatment liquid composition will be described, and the cloth will be described later.

1.1. Compound Including Polyvalent Carbodiimide Group

The treatment liquid composition includes a compound including a polyvalent carbodiimide group which has a carbodiimide group equivalent (hereinafter, referred to as "NCN equivalent" in some cases) of 500 g/mol or less. In addition, in this embodiment, in the compound including a polyvalent carbodiimide group, a resin having a polyvalent carbodiimide group is also included.

The compound including a polyvalent carbodiimide group is not particularly limited as long as having an NCN equivalent of 500 g/ml or less and at least two carbodiimide groups in its molecule.

In this embodiment, the NCN equivalent indicates a chemical formula weight per one mole of the carbodiimide group. When the cloth to which the treatment liquid composition is adhered is printed, since a printed matter having more sufficient color development property, fastness, and texture can be obtained, the NCN equivalent is preferably 450 g/mol or less and more preferably 400 g/mol or less. A lower limit of the NCN equivalent is, for example, 100 g/mol or more.

The compound including a polyvalent carbodiimide group is, in general, synthesized by a condensation reaction of an organic diisocyanate. As an organic group of the organic diisocyanate, for example, an aromatic group, an aliphatic group, or a mixture therebetween may be mentioned. As an isocyanate, for example, there may be mentioned an organic isocyanate, such as methyl isocyanate, ethyl isocyanate, propyl isocyanate, butyl isocyanate, octadecyl isocyanate, or phenyl isocyanate; or an organic diisocyanate, such as hexamethylene diisocyanate, isophorone diisocyanate, tolylene diisocyanate, diphenylmethane diisocyanate, cyclohexane diisocyanate, dicyclohexylmethane diisocyanate, xylylene diisocyanate, or tetramethylxylylene diisocyanate.

As the compound including a polyvalent carbodiimide group described above, a commercially available product may also be used. As the commercially available product, for example, there may be mentioned V-02-L2 (trade name, NCN equivalent: 385 g/mol), SV-02 (trade name, NCN equivalent: 430 g/mol), V-04 (trade name, NCN equivalent: 335 g/mol), V-(trade name, NCN equivalent: 410 g/mol), SW-12G (trade name, NCN equivalent: 465 g/mol), E-02 (trade name, NCN equivalent: 445 g/mol), E-03A (trade name, NCN equivalent: 365 g/mol), or E-05 (trade name, NCN equivalent: 310 g/mol) of Carbodilite (registered trademark) Series manufactured by Nisshinbo Chemical Inc.

The compound including a polyvalent carbodiimide group may be used alone, or at least two types thereof may be used in combination.

Since a printed matter having sufficient color development property and fastness is obtained, a content of the compound including a polyvalent carbodiimide group with respect to the total mass of the treatment liquid composition is 1.0 to 35.0 percent by mass. Since a printed matter having, besides sufficient color development property and fastness, a preferable texture is obtained, the content of the compound including a polyvalent carbodiimide group with respect to the total mass of the treatment liquid composition is preferably 2.0 to 25.0 percent by mass. Since a printed matter having, besides sufficient color development property and fastness, a more preferable texture is obtained, the content of the compound including a polyvalent carbodiimide group with respect to the total mass of the treatment liquid composition is more preferably 3.0 to 15.0 percent by mass and more preferably 4.0 to 10.0 percent by mass. Since a printed matter having more excellent color development property, fastness, and texture and being further less likely to be yellowed is obtained, the content of the compound including a polyvalent carbodiimide group with respect to the total mass of the treatment liquid composition is even more preferably 6.0 to 10.0 percent by mass.

1.2. Aromatic Carboxylic Acid and/or its Salt

The treatment liquid composition contains an aromatic carboxylic acid and/or its salt.

The aromatic carboxylic acid and/or its salt is not particularly limited as long as having at least one carboxyl group in its molecule. The aromatic compound and/or its salt may have a substituent. As the substituent, for example, there may be mentioned a hydroxy group; a sulfonate group; an alkyl group, such as a methyl group, an ethyl group, or a propyl group; an alkoxy group, such as a methoxy group, an ethoxy group, or a propoxy group; a nitro group, or an acyl group.

Since a printed matter having more sufficient color development property and fastness can be obtained, as the aromatic carboxylic acid and/or its salt, an aromatic compound having one carboxyl group in its molecule and/or its salt is preferable. As the aromatic compound, a compound having a benzene ring or a naphthalene ring is preferable, and a compound having a benzene ring is more preferable.

In addition, since the treatment liquid composition has a more preferable water solubility, and a printed matter having more sufficient color development property and fastness can be obtained, an aromatic carboxylate salt is preferable. In addition, as the salt, for example, a potassium salt, a sodium salt, a calcium salt, or a magnesium salt may be mentioned.

As the aromatic carboxylic acid and/or its salt, for example, there may be mentioned benzoic acid, phthalic acid, terephthalic acid, salicylic acid, trimesic acid, hydroxybenzoic acid, methylbenzoic acid, ethylbenzoic acid, propylbenzoic acid, butylbenzoic acid, dihydroxybenzoic acid, gallic acid, naphthalene carboxylic acid, naphthalene dicarboxylic acid, hydroxy naphthoic acid, sulfoisophthalic acid, or a salt of one of those mentioned above. Among those mentioned above, since a printed matter having sufficient color development property and fastness can be obtained, for example, benzoic acid, 1-naphthalene carboxylic acid, 2-naphthalene carboxylic acid, sulfoisophthalic acid, a benzoate salt, a 1-naphthalene carboxylate salt, a 2-naphthalene carboxylate salt, or a sulfoisophthalate salt is preferable, and a benzoate salt is more preferable.

The aromatic carboxylic acid and/or its salt may be used alone, or at least two types thereof may be used in combination.

Since a printed matter having, besides sufficient color development property and fastness, a preferable texture can be obtained, a content of the aromatic carboxylic acid and/or its salt with respect to the total mass of the treatment liquid composition is 0.1 to 30.0 percent by mass and preferably 0.5 to 15.0 percent by mass. Since a printed matter having more excellent color development property, fastness, and texture and being further less likely to be yellowed can be obtained, the content of the aromatic carboxylic acid and/or its salt with respect to the total mass of the treatment liquid composition is more preferably 0.5 to 7.0 percent by mass.

In addition, since a printed matter having more sufficient color development property and fastness can be obtained, a content ratio of the compound including a polyvalent carbodiimide group to the aromatic carboxylic acid and/or its salt (the compound including a polyvalent carbodiimide group: the aromatic carboxylic acid and/or its salt) is preferably 1:9 to 9:1 in a mass ratio. Since a printed matter having, besides more sufficient color development property and fastness, a preferable texture can be obtained, the content ratio of the compound including a polyvalent carbodiimide group to the aromatic carboxylic acid and/or its salt is more preferably 1:3 to 9:1. Since a printed matter having, besides more sufficient color development property and fastness, a preferable texture and being further less likely to be yellowed can be obtained, the content ratio of the compound including a polyvalent carbodiimide group to the aromatic carboxylic acid and/or its salt is further preferably 1:1 to 9:1. Since a printed matter having, besides more sufficient color development property and fastness, a preferable texture and being even further less likely to be yellowed can be obtained, the content ratio of the compound including a polyvalent carbodiimide group to the aromatic carboxylic acid and/or its salt is even further preferably 3:1 to 9:1.

1.3. Organic Acid

The treatment liquid composition may contain an organic acid different from the aromatic carboxylic acid. In addition, the organic acid is also different from the aromatic carboxylate salt and the compound including a polyvalent carbodiimide group. In this embodiment, since a printed matter having more sufficient color development property, fastness, and texture and being further less likely to be yellowed can be obtained, the treatment liquid composition preferably contains the organic acid.

As the organic acid, for example, there may be mentioned a polyacrylic acid, acetic acid, a glycolic acid, malonic acid, malic acid, maleic acid, ascorbic acid, succinic acid, glutaric acid, fumaric acid, citric acid, tartaric acid, lactic acid, sulfonic acid, pyrrolidone carboxylic acid, pyrrole carboxylic acid, furan carboxylic acid, pyridine carboxylic acid, or a thiophene carboxylic acid. Among those mentioned above, since a printed matter having more sufficient color development property, fastness, and texture and being further less likely to be yellowed can be obtained, malic acid, acetic acid, or citric acid is preferable, and malic acid is more preferable.

The organic acid may be used alone, or at least two types thereof may be used in combination.

since a printed matter having more sufficient color development property, fastness, and texture and being further less likely to be yellowed can be obtained, a content of the organic acid with respect to the total mass of the treatment liquid composition is preferably 0.05 to 0.5 percent by mass.

1.4. Water

The treatment liquid composition may contain water. After the treatment liquid composition is adhered to the cloth, water is vaporized away by drying. As the water, for example, there may be mentioned purified water, such as ion-exchanged water, ultrafiltration water, reverse osmosis water, or distilled water; or water, such as ultra purified water, from which ionic impurities are removed as much as possible. In addition, when the treatment liquid composition is stored for a long time, water sterilized by UV radiation or addition of hydrogen peroxide is preferably used since generation of fungi and/or bacteria can be suppressed.

A content of the water with respect to the total mass of the treatment liquid composition is 30 to 98 percent by mass, preferably 35 to 96 percent by mass, and more preferably 40 to 94 percent by mass. Since the content of the water is set in the range described above, an increase in viscosity of the treatment liquid composition is suppressed, and workability for adhesion of the treatment liquid composition to the cloth and drying property after the adhesion of the treatment liquid composition can be improved.

Since a higher affinity to the cloth containing fibers which have hydroxy groups and a higher safety can be obtained, the treatment liquid composition is preferably an aqueous treatment liquid composition. In addition, in this embodiment, the "aqueous" indicates that the content of water with respect to the total mass of the treatment liquid composition is 30 percent by mass or more.

1.5. Other Components

The treatment liquid composition may contain various additives, such as a surfactant, a solubilizing agent, a viscosity adjuster, a pH adjuster, an antioxidant, an antiseptic agent, a fungicide, a corrosion inhibitor, and/or a chelating agent.

The additives may be used alone, or at least two types thereof may be used in combination.

A content of each additive with respect to the total mass of the treatment liquid composition is approximately 0.01 to 5.0 percent by mass.

1.6. Preparation Method of Treatment Liquid Composition

The treatment liquid composition can be prepared such that after the components thereof are mixed together in an arbitrary order, impurities and/or foreign materials are removed, if needed, by filtration or the like. As a mixing method of the components, there may be mentioned a method in which after the components are sequentially added in a container equipped with a stirring device, such as a mechanical stirrer or a magnetic stirrer, mixing thereof is performed by stirring. As a filtration method, for example, centrifugal filtration or filter filtration may be mentioned.

1.7. Physical Properties of Treatment Liquid Composition

Physical properties of the treatment liquid composition may be arbitrarily adjusted, for example, in accordance with the type of cloth and/or a method to adhere the treatment liquid composition to the cloth, that is, a coating method. The coating method of the treatment liquid composition will be described later.

1.7.1. Viscosity

A viscosity of the treatment liquid composition at 20° C. is preferably set to 1.5 to 100 mPa·s. Since the viscosity of the treatment liquid is set in the range described above, when the treatment liquid composition is adhered to the cloth, a coating property, such as spreadability, of the treatment liquid can be improved.

In addition, the viscosity of the treatment liquid composition is measured, for example, using a viscoelastic tester MCR-300 (manufactured by Pysica). In particular, a temperature of the treatment liquid composition is controlled at 20° C., and a shear viscosity (mPa·s) at a shear rate of 200 (1/s) is read for the measurement.

1.7.2. Surface Tension

A surface tension of the treatment liquid composition at 25° C. is preferably set to 30 to 50 mN/m. Since the surface tension of the treatment liquid composition at 25° C. is set in the range described above, appropriate wettability on and permeability in the cloth can be obtained. In addition, since the treatment liquid composition is likely to be uniformly absorbed in the cloth, the difference in adhesion amount generated when the treatment liquid composition is applied, that is, generation of coating irregularity, can be suppressed.

In addition, the surface tension of the treatment liquid composition may be measured using, for example, an automatic surface tension meter CBVP-Z (manufactured by Kyowa Interface Science Co., Ltd.). In particular, in an environment at 25° C., a surface tension obtained when a platinum plate is wetted with the treatment liquid composition is read for the measurement.

2. Ink Jet Printing Ink Composition

An ink jet printing ink composition (hereinafter, referred to as "ink composition" in some cases) is used to manufacture a printed matter by printing the cloth to which the treatment liquid composition is adhered. Next, the ink composition will be described.

The ink composition according to this embodiment contains a colorant and water.

2.1. Colorant

The ink composition contains a colorant.

As the colorant, for example, a dye and an organic pigment may be mentioned. Among those mentioned above, a dye is preferable, and since a more excellent color development property can be obtained for the cloth to which the treatment liquid composition is adhered, a disperse dye is more preferable. The colorant may be used alone, or at least two types thereof may be used in combination.

As the dye, for example, there may be mentioned an acidic dye, such as C.I. Acid Yellow, C.I. Acid Red, C.I. Acid Blue, C.I. Acid Orange, C.I. Acid Violet, or C.I. Acid Black; a basic dye, such as C.I. Basic Yellow, C.I. Basic Red, C.I. Basic Blue, C.I. Basic Orange, C.I. Basic Violet, or C.I. Basic Black; a direct dye, such as C.I. Direct Yellow, C.I. Direct Red, C.I. Direct Blue, C.I. Direct Orange, C.I. Direct Violet, or C.I. Direct Black; a reactive dye, such as C.I. Reactive Yellow, C.I. Reactive Red, C.I. Reactive Blue, C.I. Reactive Orange, C.I. Reactive Violet, or C.I. Reactive Black; a disperse dye, such as C.I. Disperse Yellow, C.I. Disperse Red, C.I. Disperse Blue, C.I. Disperse Orange, C.I. Disperse Violet, or C.I. Disperse Black; or a solvent dye such as C.I. Solvent Blue.

Among those mentioned above, the disperse dye is preferable, and besides the disperse dye, the acidic dye, the basic dye, and the solvent dye, which are not likely to be dissolved in water and which are dispersed in an aqueous ink, are also preferably used. In particular, a sublimation dye is more preferable, and the "sublimation dye" indicates a dye to be sublimated by heating.

As the sublimation dye described above, for example, there may be mentioned C. I. Disperse Yellow 3, 7, 8, 23, 39, 51, 54, 60, 71, or 86; C. I. Disperse Orange 1, 1: 1, 5, 20, 25, 25: 1, 33, 56, or 76; C. I. Disperse Brown 2; C. I. Disperse Red 11, 50, 53, 55, 55: 1, 59, 60, 65, 70, 75, 93, 146, 158, 190, 190: 1, 207, 239, or 240; C. I. Vat Red 41; C. I. Disperse Violet 8, 17, 23, 27, 28, 29, 36, or 57; C. I. Disperse Blue 14, 19, 26, 26: 1, 35, 55, 56, 58, 64, 64: 1, 72, 72: 1, 81, 81: 1, 91, 95, 108, 131, 141, 145, or 359; or C. I. Solvent Blue 36, 63, 105, or 111.

In this embodiment, since a more preferable dyeing property can be obtained for the cloth to which the treatment liquid composition is adhered, and a printed matter having a sufficient color development property can be obtained, a cyan dye or a red dye is preferable. Furthermore, since a further preferable dyeing property can be obtained, and a printed matter having a sufficient color development property can be obtained, a cyan dye is more preferable, and C.I. Disperse Blue 359 is further preferable. In addition, as the red dye, C.I. Disperse Red 60 is more preferable.

In order to more effectively and reliably obtain an operational effect of this embodiment, a content of the colorant with respect to the total mass of the ink composition is preferably 0.05 to 20 percent by mass.

2.2. Water

The ink composition contains water.

As the water, the water contained in the above treatment liquid composition may be mentioned for reference.

In order to more effectively and reliably obtain the operational effect of this embodiment, a content of the water with respect to the total mass of the ink composition is preferably 30 to 80 percent by mass.

2.3. Dispersant

The ink composition may contain a dispersant.

When the ink composition contains a dispersant, dispersibility of the disperse dye is improved, and hence, clogging resistance of the ink composition is also improved. As the dispersant, for example, a sodium naphthalene sulfonate/ formalin condensate or a resin may be mentioned. The sodium naphthalene sulfonate/formalin condensate is a compound obtained by formalin condensation of a sulfonate compound having a naphthalene ring in its molecule or its salt. The dispersant may be used alone, or at least two types thereof may be used in combination.

Since having a more preferable dispersibility, as the dispersant, a resin is preferably contained. As the resin, for example, there may be mentioned an urethane-based resin, a styrene/acrylic-based resin, an acrylic-based resin, a fluorene-based resin, a polyolefin-based resin, a rosin modified resin, a terpene-based resin, a polyester-based resin, a polyamide-based resin, an epoxy-based resin, a vinyl chloride-based resin, a vinyl chloride-vinyl acetate-based resin, or an ethylene-vinyl acetate-based resin. Among those mentioned above, since the clogging resistance is superior, as the resin, an urethane-based resin or a styrene/acrylic-based resin is preferable, and a styrene/acrylic-based resin is more preferable.

As long as having an urethane bond in its molecule, the urethane-based resin is not particularly limited. As the urethane-based resin, for example, there may be mentioned a polyether type urethane resin including an ether bond in its main chain besides an urethane bond, a polyester type urethane resin including an ester bond in its main chain besides an urethane bond, or a polycarbonate type urethane resin including a carbonate bond in its main chain besides an urethane bond. The urethane-based resin may be used alone, or at least two types thereof may be used in combination.

As the urethane-based resin, a commercially available product may also be used. As the commercially available product, for example, there may be mentioned Takelac (registered trademark) W6110 (trade name) manufactured by Mitsui Chemicals Inc.; Acrit (registered trademark) WBR-022U (trade name) manufactured by Taisei Fine Chemical Co., Ltd.; Permarin (registered trademark) UX-368T (trade name), UPRENE (registered trademark) UXA-307 (trade name), or UCOAT (registered trademark) UWS-145 (trade name), manufactured by Sanyo Chemical Industries, Ltd.; or Solsperse (registered trademark) 47000 (trade name) manufactured by Lubrizol Corporation.

As the styrene/acrylic-based resin, for example, there may be mentioned a styrene-acrylic acid copolymer, a styrene-methacrylic acid copolymer, a styrene-methacrylic acid-acrylate ester copolymer, a styrene-α-methylstyrene-acrylic acid copolymer, or a styrene-α-methylstyrene-acrylic acid-acrylate ester copolymer. The copolymers mentioned above each may have any form selected from a random copolymer, a block copolymer, an alternating copolymer, and a graft copolymer.

As the styrene/acrylic-based resin, a commercially available product may also be used. As the commercially available product, for example, Johncryl (registered trademark) 67 (trade name) manufactured by BASF Japane or Solsperse (registered trademark) 43000 (trade name) manufactured by Lubrizol Corporation may be mentioned.

In order to more effectively and reliably obtain the operational effect of this embodiment, a content of the dispersant with respect to the total mass of the ink composition is preferably 3.0 to 8.0 percent by mass.

2.4. Surfactant

The ink composition may contain a surfactant.

As the surfactant, for example, an acetylene glycol-based surfactant, a fluorine-based surfactant, or a silicone-based surfactant may be mentioned. The surfactant may be used alone, or at least two types thereof may be used in combination.

As the acetylene glycol surfactant, for example, 2,4,7,9-tetramethyl-5-decyne-4,7-diol, an alkylene oxide adduct thereof, 2,4-dimethyl-5-decyne-4-ol, or an alkylene oxide adduct thereof may be mentioned.

As the acetylene glycol-based surfactant, a commercially available product may also be used. As the commercially available product, for example, there may be mentioned Olfine (registered trademark) 104 Series (trade name) and E Series (trade name) manufactured by Nisshin Chemical Industry Co., Ltd., and Surfynol (registered trademark) Series (trade name) manufactured by Air Products & Chemicals Incorporated.

As the fluorine-based surfactant, for example, there may be mentioned a perfluoroalkyl sulfonate salt, a perfluoroalkyl carbonate salt, a perfluoroalkyl phosphate ester, a perfluoroalkyl ethylene oxide adduct, a perfluoroalkyl betaine, or a perfluoroalkyl amine oxide compound.

As the fluorine-based surfactant, a commercially available product may also be used. As the commercially available product, for example, S-144 (trade name) or S-145 (trade name) manufactured by Asahi Glass Co., Ltd. may be mentioned.

As the silicone-based surfactant, a polysiloxane-based compound or a polyether modified organosiloxane may be mentioned.

As the silicone-based surfactant, a commercially available product may also be used. As the commercially available product, for example, 306, 307, 333, 341, 345, 346, 347, 348, or 349 (trade name) of BYK (registered trademark) Series manufactured by BYK Japan KK may be mentioned.

In order to more effectively and reliably obtain the operational effect of this embodiment, a content of the surfactant with respect to the total mass of ink composition is preferably 0.5 to 5.0 percent by mass.

2.5. Water-Soluble Organic Solvent

The ink composition may contain a water-soluble organic solvent.

As the water-soluble organic solvent, for example, there may be mentioned glycerin; a glycol, such as ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, or 1,6-hexanediol; a glycol monoether, such as ethylene glycol monomethyl ether, ethylene glycol monoethyl ether, diethylene glycol monomethyl ether, diethylene glycol monoethyl ether, propylene glycol monomethyl ether, propylene glycol monoethyl ether, dipropylene glycol monomethyl ether, dipropylene glycol monoethyl ether, or triethylene glycol monomethyl ether; a nitrogen-containing solvent, such as 2-pyrrolidone, N-methyl-2-pyrrolidone, or N-ethyl-2-pyrrolidone; or an alcohol, such as methanol, ethanol, n-propyl alcohol, iso-propyl alcohol, n-butanol, 2-butanol, tert-butanol, iso-butanol, n-pentanol, 2-pentanol, 3-pentanol, or tert-pentanol.

The water-soluble organic solvent may be used alone, or at least two types thereof may be used in combination.

In order to more effectively and reliably obtain the operational effect of this embodiment, a content of the water-soluble organic solvent with respect to the total mass of ink composition is preferably 5 to 30 percent by mass.

2.6. Other Components

The ink composition may contain various additives, such as a solubilizing agent, a viscosity adjuster, a pH adjuster, an antioxidant, an antiseptic agent, a fungicide, a corrosion inhibitor, and/or a chelating agent to trap metal ions influencing the dispersion.

The additive may be used alone, or at least two types thereof may be used in combination.

As the antiseptic agent, for example, there may be mentioned sodium pentachlorophenol, 2-pyridinethiol-1-oxide sodium, or 1,2-dibenzinethiazoline-3-on (such as CRL, BND, GXL, XL-2, or TN (trade name) of Proxel (registered trademark) manufactured by Lonza Japan Ltd.). The antiseptic agent may be used alone, or at least two types thereof may be used in combination.

A content of each additive with respect to the total mass of the ink composition is approximately 0.01 to 5.0 percent by mass.

2.7. Method for Manufacturing Ink Composition

The ink composition can be prepared such that after the colorant, water, and other components, if needed, are mixed together in an arbitrary order, impurities and/or foreign materials are removed, if needed, by filtration or the like. As a mixing method of each component, for example, a method in which after the components are sequentially added in a container equipped with a stirring device, such as a mechanical stirrer or a magnetic stirrer, mixing thereof is performed by stirring. As a filtration method, for example, centrifugal filtration or filter filtration may be mentioned.

3. Ink Jet Printing Ink Set

An ink jet printing ink set includes the above treatment liquid composition and the above ink composition.

In this embodiment, the treatment liquid composition is adhered in advance to the cloth containing fibers which have hydroxy groups, so that the cloth to which the treatment liquid composition is adhered is obtained. Since the ink composition is printed on the cloth to which the treatment liquid composition is adhered, a printed matter having sufficient color development property and fastness, such as abrasion resistance and water resistance, can be easily obtained. In addition, since containing no harmful components, the printed matter thus obtained has a high safety and a small environmental load.

4. Cloth

The cloth according to this embodiment contains fibers having hydroxy groups.

As a material forming the cloth, for example, there may be mentioned natural fibers of cotton, hemp, wool, silk, or the like; synthetic fibers of a polypropylene, a polyester, an acetate, a triacetate, a polyamide, a polyurethane or the like having hydroxy groups in its structure; or biodegradable fibers of a polylactic acid or the like. In addition, the cloth may be composed of blended fibers formed from those mentioned above.

Since a printed matter having, besides more sufficient color development property and fastness, such as abrasion resistance and water resistance, a preferable texture and being further less likely to be yellowed can be obtained, the cloth is preferably formed from cotton.

As the form of the cloth, for example, a woven cloth, a knitted cloth, a non-woven cloth, a fabric, a garment, and an accessory other than those mentioned above may be mentioned. As the garment and the accessory, for example, there may be mentioned sewn products, such as a T shirt, a handkerchief, a scarf, a towel, a handbag, and a cloth-made bag; furniture, such as a curtain, a sheet, a bed cover, and wallpaper; and fabrics before and after cutting to be used as materials to be sewn. As the forms of those materials mentioned above, for example, there may be mentioned a material having a long roll shape, a material having a predetermined size by cutting, and a material having a product shape. In addition, the cloth may have any shape as long as the treatment liquid composition is adhered thereto, and as the cloth, a cloth to which the treatment liquid composition is adhered in advance may also be used.

A weight per unit area of the cloth is preferably 1.0 to 10.0 Oz. When the weight per unit area of the cloth is in the range described above, preferable recording can be performed.

As long as containing fibers which have hydroxy groups, a cloth colored in advance with a dye may also be used. Since the treatment liquid composition can suppress generation of treatment traces while securing the fastness and the color development property of the cloth, the cloth colored in advance may also be used as long as containing fibers which have hydroxy groups. That is, even if the cloth is colored in advance, since the printing can be performed so as to have an excellent color development property while the generation of treatment traces is suppressed, the quality and the commercial value of the printed matter as the product can be increased as compared to that in the past.

As the dye to color the cloth in advance, for example, there may be mentioned a water-soluble dye, such as an acidic dye or a basic dye; a disperse dye to be used in combination with a dispersant; a reactive dye; or a solvent dye. When a cotton cloth is used as the cloth, a reactive dye suitable for cotton dyeing is preferably used.

5. Printing Method

A printing method of this embodiment includes a treatment liquid composition adhesion step of adhering the treatment liquid composition to the cloth containing fibers which have hydroxy groups. By the step described above, the cloth to which the treatment liquid composition is adhered can be obtained. In addition, when the ink composition is adhered to the cloth described above, a printed matter having sufficient color development property and fastness can be obtained.

After the above treatment liquid composition adhesion step is performed, the printing method preferably includes an ink composition adhesion step of adhering the ink composition to the cloth to which the treatment liquid composition is adhered. In addition, the ink composition to be adhered to the cloth is not particularly limited as long as containing a colorant, and for example, the ink jet printing ink composition according to this embodiment may be used. In addition, for the ink composition adhesion step, a printing method using an ink jet method which will be described later may be mentioned for reference.

In the printing method, various types of cloths may be used, and a preferable printing may be performed.

An adhesion amount of the treatment liquid composition to the cloth is preferably set, for example, in the range of 0.02 to 0.5 g/cm² and more preferably 0.02 to 0.3 g/cm². Since the adhesion amount of the treatment liquid composition is set in the range described above, the treatment liquid composition can be more uniformly adhered to the cloth, aggregation irregularities of an image of the printed matter can be further suppressed, and the color development property can be improved.

As a method to adhere the treatment liquid composition to the cloth, for example, there may be mentioned an immersion coating method in which the cloth is immersed in the treatment liquid composition; a roller coating method in which the treatment liquid composition is coated by a mangle roller machine or a roll coater; a spray coating method in which the treatment liquid composition is sprayed by a spray device or the like; or an ink jet coating method in which the treatment liquid composition is sprayed by an ink jet method. In order to adhere the treatment liquid composition to the cloth, among the coating methods described above, one method may be used alone, or at least two methods may be used in combination.

In this embodiment, the degree of freedom on the design of the adhesion amount of the treatment liquid composition is increased, defects are not likely to be generated in the adhesion, and the treatment liquid composition can be uniformly adhered to the cloth; hence, by using a roller machine, such as a mangle roller machine or a roll coater, the treatment liquid composition is preferably adhered to the cloth.

After the treatment liquid composition is adhered to the cloth, the printing method may further include a drying step of drying the treatment liquid composition adhered to the cloth. For the drying of the treatment liquid composition, although spontaneous drying may be performed, in consideration of an increase of the adhesion amount of the treatment liquid composition to the cloth and an increase of a drying rate, the drying is preferably performed with heating.

As a heating method, for example, a heat press method, a normal pressure steam method, a high pressure steam method, or a thermofix method may be mentioned. In addition, as a heating source, for example, infrared rays (lamp) may be mentioned.

In addition, a heating temperature is preferably set, for example, to 180° C. or less. Accordingly, even when the cloth is colored in advance with a dye, while sublimation of the dye by heat drying is suppressed, discoloration of natural color of the cloth can be suppressed. In addition, a lower limit of the heating temperature may be set so that a medium, such as moisture, contained in the treatment liquid composition is vaporized and is preferably set to 100° C. or less.

After the treatment liquid composition is adhered to the cloth, the printing method may include, if needed, a washing step. Since the printing method includes the step described above, components contained in the treatment liquid composition not adhered to the cloth can be removed.

6. Ink Jet Printing Method

An ink jet printing method is a method for adhering the ink composition to the cloth to which the treatment liquid composition is adhered by an ink jet method. By using the ink jet method, a dyed portion of a fine pattern can be reliably formed. In addition, this method can be applied to various cloths, and a preferable printing can be performed. By the ink jet printing method, even on a cloth having a certain thickness, a preferable printing having a small color difference between a front and a rear side can be performed. As the ink jet printing method, for example, an indirect printing recording method or a direct printing recording method may be mentioned.

6.1. Ink Jet Recording Apparatus

An ink jet recording apparatus used for the printing method is not particularly limited, and any apparatus may be used which at least includes an ink container receiving the ink composition and a recording head connected thereto and which ejects the ink composition from the recording head and forms an image on the cloth to which the treatment liquid composition is adhered or on transfer paper functioning as an intermediate transfer medium. In addition, as the ink jet recording apparatus, either a serial type or a line type may be used. In both the types of ink jet recording apparatuses, a recording head is mounted, and while a relative positional relationship between the recording head and the cloth or the transfer paper is changed, liquid droplets of the ink composition are intermittently ejected in a predetermined volume and at a predetermined timing. Accordingly, the ink composition is adhered to the cloth or the intermediate paper, so that a predetermined image can be formed.

In general, in a serial type ink jet recording apparatus, a transport direction of a recording medium and a direction of reciprocal movement of the recording head are intersected to each other, and by the combination of the reciprocal movement of the recording head and the transport movement of the recording medium, the relative positional relationship between the recording medium and the recording head is changed. In addition, in the case described above, in general, a plurality of nozzle holes is disposed in the recording head, and along the transport direction of the recording medium, at least one line of the nozzle holes, that is, at least one nozzle line, is formed. In addition, in accordance with the types and the number of the ink compositions, a plurality of nozzle lines may be formed in the recording head in some cases.

In addition, in general, in a line type ink jet recording apparatus, the recording head performs no reciprocal movement, and a relative positional relationship between a recording medium and the recording head is changed by the transport of the recording medium. In the case described above, in general, a plurality of nozzle holes is also disposed in the recording head, and at least one nozzle line is formed along a direction intersecting the transport direction of the recording medium.

6.2. Indirect Printing Recording Method

An ink jet printing method of this embodiment includes a treatment liquid composition adhesion step of adhering the treatment liquid composition to the cloth containing fibers which have hydroxy groups, an ejection step of ejecting the ink composition from a recording head so as to be adhered to an intermediate transfer medium; and a transfer step of transferring the ink composition adhered to the intermediate transfer medium to the cloth to which the treatment liquid composition is adhered. In particular, by this printing method, an ink composition containing a disperse dye, such as a sublimation dye, is ejected by a liquid ejecting head functioning as the recording head so as to be adhered to the intermediate transfer medium, heating is performed while a surface of the intermediate transfer medium to which the ink composition is adhered faces a cloth surface to which the treatment liquid composition is adhered so that the disperse dye contained in the ink composition is transferred to the cloth to which the treatment liquid composition is adhered. In this embodiment, the printing method as described above is also called an indirect printing method. According to this printing method, a preferable printing can be performed without any restriction of the cloth form.

6.2.1. Treatment Liquid Composition Adhesion Step

As the treatment liquid composition adhesion step, the printing method described above may be mentioned for reference.

6.2.2. Ejection Step

In the ejection step, a heated ink composition is ejected from the liquid ejecting head so as to be adhered to the intermediate transfer medium. In particular, a pressure generating device is driven, and the ink composition filled in a pressure generating chamber of the liquid ejecting head is ejected from the nozzle.

As the intermediate transfer medium, for example, paper, such as regular paper, or a recording medium including an ink receiving layer may be used. As the recording medium including an ink receiving layer, for example, ink jet exclusive paper or coated paper may be mentioned. Among those mentioned above, paper including an ink receiving layer which contains inorganic particles, such as silica, is more preferable. Accordingly, in a process in which the ink composition applied to the intermediate transfer medium is dried, an intermediate recorded matter in which, for example, bleeding on a recorded surface is suppressed can be obtained. In addition, according to the medium as described above, the disperse dye is likely to stay on the recorded surface, and in the following transfer step, the sublimation of the disperse dye can be more efficiently performed.

In this step, a plurality of ink compositions may be used. Accordingly, for example, a color gamut to be exhibited can be further increased. One of the plurality of ink compositions described above may be the ink composition of this embodiment, and at least two types thereof each may be the ink composition of this embodiment.

6.2.3. Transfer Step

The transfer step is a step in which heating is performed such that while the surface of the intermediate transfer medium to which the ink composition is adhered faces the cloth surface to which the treatment liquid composition is adhered, the disperse dye contained in the ink composition is transferred to the cloth to which the treatment liquid composition is adhered. Accordingly, the disperse dye is transferred, and a printed matter which is the cloth to which the ink composition is adhered is obtained.

In this step, the heating may be performed while the intermediate transfer medium to which the ink composition is adhered faces the cloth to which the treatment liquid composition is adhered. In this step, the heating is more preferably performed while the intermediate transfer medium is in close contact with the cloth to which the treatment liquid composition is adhered. Accordingly, for example, a clearer image is recorded on the cloth to which the treatment liquid composition is adhered, that is, dyeing can be performed.

As a heating method, for example, a steaming method using vapor, a heat press method by dry heating, a thermosol method, an HT steamer method by superheated vapor, or an HP steamer method by a pressurized vapor may be mentioned. On the cloth to which the ink composition is adhered, a heating treatment may be performed immediately or after a predetermined time passes. Since a printed matter having sufficient color development property and fastness can be obtained, as the heating method, dry heating is preferable.

A heating temperature is preferably 160° C. to 220° C. and more preferably 190° C. to 210° C. Since the heating temperature is in the range described above, energy required for the transfer can be further reduced, and the productivity of the printed matter tends to be improved. In addition, the color development property of the printed matter tends to be further improved.

Although depending on the heating temperature, a heating time is preferably 30 to 120 seconds and more preferably 40 to 90 seconds. Since the heating time is in the range described above, energy necessary for the transfer can be further reduced, and the productivity of the printed matter tend to be further improved. In addition, the color development property of the printed matter tends to be further improved.

An adhesion amount of the ink composition to be adhered to the cloth by the transfer per unit area of the cloth is preferably 1.5 to 6.0 mg/cm$^2$. Since the adhesion amount of the ink composition is in the range described above, the color development property of an image or the like to be formed by the printing is improved, and in addition, since the drying property of the ink adhered to the cloth is secured, bleeding of the image or the like can be suppressed from being generated.

6.2.4. Other Steps

This method may also include, if needed, an intermediate treatment step and a post-treatment step.

As the intermediate treatment step, for example, a step of preliminarily heating the cloth to which the treatment liquid composition is adhered may be mentioned.

As the post-treatment step, for example, a step of washing the printed matter may be mentioned.

6.3. Direct Printing Recording Method

An ink jet printing method of this embodiment includes a treatment liquid composition adhesion step of adhering the treatment liquid composition to the cloth containing fibers which have hydroxy groups and an ink composition adhesion step of ejecting the ink composition from a recording head so as to be adhered to the cloth to which the treatment liquid composition is adhered. In this embodiment, the printing method as described above is also called a direct printing method. According to this printing method, a dyed portion of a fine pattern can be easily and reliably formed. In addition, since a printing plate, such as the intermediate transfer medium, is not required to be used, on-demand characteristics are excellent, and small quantity production and multi-product production can be preferably performed.

6.3.1. Step of Obtaining Cloth to which Treatment Liquid Composition is Adhered

As the treatment liquid composition adhesion step, the printing method described above may be mentioned for reference.

6.3.2. Ink Composition Adhesion Step

In the ink composition adhesion step, the ink composition is adhered to the cloth to which the treatment liquid composition is adhered. In addition, in the ink composition adhesion step, a step of further adhering the ink composition on a region to which the ink composition is adhered may be further included.

In the ink composition adhesion step, a maximum adhesion amount to the cloth is preferably 50 to 200 $mg/cm^2$ and more preferably 80 to 150 $mg/cm^2$. When the maximum adhesion amount is in the range described above, the color development property is further improved. In addition, the abrasion resistance of an image is also improved, and aggregation irregularities tend to be less noticeable.

In this step, when the ink composition is adhered to the cloth to which the treatment liquid composition is adhered, heating is preferably performed. Accordingly, for example, on the cloth to which the treatment liquid composition is adhered, a clearer image can be recorded, that is, dyeing can be performed.

As a heating method, for example, a heat press method, a normal pressure steam method, a high pressure steam method, or a thermofix method may be mentioned. In addition, as a heat source of the heating, for example, a hot wind, infrared rays, or microwaves may be mentioned.

In the heating, a surface temperature of the cloth thus heated is preferably 60° C. to 180° C. Since the surface temperature is in the range described above, damage on the ink jet head and/or the cloth can be reduced, and in addition, the ink is likely to uniformly wet spread on and permeate in the cloth. In addition, the surface temperature may be measured using, for example, a non-contact thermometer (trade name: IT2-80, manufactured by Keyence Corporation) may be used.

A heating time is preferably set, for example, to five seconds to five minutes. Since the heating time is set in the range described above, while the damage on the ink jet head and/or the cloth is reduced, the cloth can be sufficiently heated.

6.3.3. Other Steps

The method described above may further include, if needed, an intermediate treatment step and a post-treatment step. For the steps described above, the other steps of the indirect printing recording method described above may be mentioned for reference.

EXAMPLES

Hereinafter, the present disclosure will be described in detail with reference to Examples and Comparative Examples. However, the present disclosure is not limited to the following examples.

1. Preparation of Printing Treatment Liquid Composition

Examples 1 to 12 and Comparative Examples 1 to 5

After components were charged in a mixing tank so as to have the composition shown in Table 1 and then mixed together by stirring, filtration was further performed using a 5-μm membrane filter, so that respective treatment liquid compositions were obtained. In addition, the numerical value of each component shown in Table 1 represents percent by mass.

In addition, the components shown in Table 1 are as follows.

Compound Having Polyvalent Carbodiimide Group
    V-02: Carbodilite (registered trademark) V-02 (trade name, manufactured by Nisshinbo Chemical Inc.; NCN equivalent: 590 g/mol
    V-10: Carbodilite (registered trademark) V-10 (trade name, manufactured by Nisshinbo Chemical Inc.; NCN equivalent: 410 g/mol
    V-02-L2: Carbodilite (registered trademark) V-02-L2 (trade name, manufactured by Nisshinbo Chemical Inc.; NCN equivalent: 385 g/mol
    SV-02: Carbodilite (registered trademark) SV-02 (trade name, manufactured by Nisshinbo Chemical Inc.; NCN equivalent: 430 g/mol
Aromatic Carboxylate Salt
Sodium Benzoate
Organic Acid
Malic ACid

TABLE 1

|  |  |  | EXAMPLE 1 | EXAMPLE 2 | EXAMPLE 3 | EXAMPLE 4 | EXAMPLE 5 | EXAMPLE 6 |
| --- | --- | --- | --- | --- | --- | --- | --- | --- |
| TREATMENT LIQUID | COMPOUND INCLUDING | V-02 V-10 |  | 5 | 5 | 9 |  |  |

TABLE 1-continued

| COMPOSITION (PERCENT BY MASS) | POLYVALENT CARBODIIMIDE GROUP | V-02-L2 | | | | 5 | 5 | 9 |
|---|---|---|---|---|---|---|---|---|
| | | SV-02 | | | | | | |
| | AROMATIC CARBOXYLATE SALT | SODIUM BENZOATE | 1 | 10 | 1 | 1 | 10 | 1 |
| | ORGANIC ACID | MALIC ACID | | | | | | |
| | PURIFIED WATER | | BALANCE | BALANCE | BALANCE | BALANCE | BALANCE | BALANCE |

| | | | EXAMPLE 7 | EXAMPLE 8 | EXAMPLE 9 | EXAMPLE 10 | EXAMPLE 11 | EXAMPLE 12 |
|---|---|---|---|---|---|---|---|---|
| TREATMENT LIQUID COMPOSITION (PERCENT BY MASS) | COMPOUND INCLUDING POLYVALENT CARBODIIMIDE GROUP | V-02 | | | | | | |
| | | V-10 | | | | | | |
| | | V-02-L2 | | | | 20 | 30 | |
| | | SV-02 | 5 | 5 | 9 | | | 5 |
| | AROMATIC CARBOXYLATE SALT | SODIUM BENZOATE | 1 | 10 | 1 | 10 | 10 | 10 |
| | ORGANIC ACID | MALIC ACID | | | | | | 0.1 |
| | PURIFIED WATER | | BALANCE | BALANCE | BALANCE | BALANCE | BALANCE | BALANCE |

| | | | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|---|---|
| TREATMENT LIQUID COMPOSITION (PERCENT BY MASS) | COMPOUND INCLUDING POLYVALENT CARBODIIMIDE GROUP | V-02 | NO PREPARATION OF TREATMENT LIQUID COMPOSITION | 1 | 5 | 5 | 9 |
| | | V-10 | | | | | |
| | | V-02-L2 | | | | | |
| | | SV-02 | | | | | |
| | AROMATIC CARBOXYLATE SALT | SODIUM BENZOATE | | 1 | 10 | 1 | 1 |
| | ORGANIC ACID | MALIC ACID | | | | | |
| | PURIFIED WATER | | | BALANCE | BALANCE | BALANCE | BALANCE |

In addition, in Comparative Example 1, the treatment liquid composition was not prepared.

2. Preparation of Ink Jet Printing Ink Composition
Ink 1 and Ink 2

After components were charged in a mixing tank so as to have the composition shown in Table 2 and then mixed together by stirring, filtration was further performed using a 5-μm membrane filter, so that inks 1 and 2 were obtained as the ink compositions. In addition, the numerical value of each component shown in Table 2 represents percent by mass.

In addition, the components shown in Table 2 are as follows.

Colorant
  Disperse Blue 359: C.I. Disperse Blue 359 (commercially available product)
  Disperse Red 60: C.I. Disperse Red 60 (commercially available product)

Dispersant
  Solsperse (R) 47000: Solsperse (registered trademark) 47000 (trade name, styrene-acrylic-based resin, manufactured by Lubrizol Corporation Surfactant
  BYK (R)-348: BYK (registered trademark)-348 (trade name, silicone-based surfactant, manufactured by BYK Japan KK)

Water-Soluble Organic Solvent
  Glycerin
  Propylene Glycol

Antiseptic Agent
  Proxel (R) XL-2: Proxel (registered trademark) XL-2 (trade name, manufactured by Lonza Japan Ltd.)

TABLE 2

| | | | INK 1 | INK 2 |
|---|---|---|---|---|
| INK JET PRINTING INK COMPOSITION (PERCENT BY MASS) | COLORANT | Disperse Blue 359 | 4.5 | |
| | | Disperse Red 60 | | 6.5 |
| | DISPERSANT | SOLSPERSE (R) 47000 | 4.5 | 6.5 |
| | SURFACTANT | BYK (R)-348 | 0.8 | 0.8 |
| | WATER-SOLIBLE ORGANIC SOLVENT | GLYCERIN | 10 | 10 |
| | | PROPYLENE GLYCOL | 10 | 10 |
| | ANTISEPTIC AGENT | PROXEL (R) XL-2 | 0.2 | 0.2 |
| | | PURIFIED WATER | BALANCE | BALANCE |
| | | TOTAL | 100 | 100 |

3. Formation of Printed Matter

3.1. Formation of Cloth to which Treatment Liquid Composition is Adhered

Examples 1 to 12 and Comparative Examples 2 to 5

The treatment liquid composition of each of Examples 1 to 12 and Comparative Examples 2 to 5 was adhered to a cloth. In particular, the cloth to which the treatment liquid composition was adhered was obtained as described below.

White Cotton Broad #4000 (trade name, manufactured by Toyobo Co., Ltd.) used as the cloth was immersed in the treatment liquid composition, and the treatment liquid composition was applied to the cloth by a mangle roller machine so as to obtain a squeezing rate of 80%. Subsequently, after being dried at 120° C. for two minutes, the cloth was further dried at 170° C. for one minute. The cloth thus dried was washed with water for five minutes and then dried, so that the cloth to which the treatment liquid composition was adhered was obtained.

In addition, the squeezing rate was calculated by the following equation (1).

$$S(\%) = [(A-B)/B] \times 100 \quad (1)$$

In Equation (1), S represents the squeezing rate (%), A represents the mass of the cloth to which the treatment liquid composition was adhered, and B represents the mass of the cloth before the treatment liquid composition is adhered.

3.2. Formation of Intermediate Recording Medium to which Ink Composition is Adhered Examples 1 to 12 and Comparative Examples 1 to 5

The ink 1 was filled in a cartridge of an ink jet printer PX-G930 (trade name, manufactured by Seiko Epson Corporation). Subsequently, the ink was adhered to a recording medium (TRANSJET Sportline (trade name) manufactured by Chem Paper) to form a 100% duty solid pattern at a resolution of 720 dpi×720 dpi and at an ink ejection amount of 12 mg/inch². Accordingly, an intermediate recording medium 1 to which the ink composition was adhered was obtained.

In addition, except for that the ink 2 was used instead of the ink 1, an intermediate recording medium 2 to which the ink composition was adhered was obtained in a manner similar to that described above.

3.3. Printing

Examples 1 to 12 and Comparative Examples 2 to 5

The intermediate recording medium 1 thus obtained to which the ink composition was adhered was thermal-transferred to the cloth obtained as described above to which the treatment liquid composition was adhered at a temperature of 200° C. and a pressure of 4.2 N/cm³ for 60 seconds by a heat press machine TP-608M (trade name, manufactured by Taiyo Seiki Co., Ltd.), so that a printed matter which was the cloth to which the ink 1 was adhered was obtained.

In addition, except for that the ink 2 was used instead of the ink 1, a printed matter which was the cloth to which the ink 2 was adhered was obtained.

Comparative Example 1

The intermediate recording medium 1 thus obtained to which the ink composition was adhered was thermal-transferred to white broad #4000 (trade name, manufactured by Toyobo Co., Ltd.) at a temperature of 200° C. and a pressure of 4.2 N/cm³ for 60 seconds by a heat press machine TP-608M (trade name, manufactured by Taiyo Seiki Co., Ltd.), so that a printed matter which was the cloth to which the ink 1 was adhered was obtained.

In addition, except for that the ink 2 was used instead of the ink 1, a printed matter which was the cloth to which the ink 2 was adhered was obtained.

4. Evaluation Method

4.1. Color Development Property

4.1.1. Color Development Property of Printed Matter Including Ink 1

By using a fluorescent spectrodensitometer FD-7 (trade name, manufactured by Konica Minolta, Inc.), an optical density (OD value) of each printed matter which was the cloth to which the ink 1 was adhered was measured.

Observation light source: D65
Observation field: 2°
Status: T
UV filter: mounted Subsequently, by comparison between the OD value of the printed matter of each of Examples 1 to 12 and Comparative Examples 2 to 5 and the OD value of the printed matter of Comparative Example 1, the color development property was evaluated in accordance with the following evaluation criteria. The results thereof are shown in Table 3.

A: the OD value was higher by 160% or more than the OD value of the printed matter of Comparative Example 1.
B: the OD value was higher by 150% to less than 160% than the OD value of the printed matter of Comparative Example 1.
C: the OD value was higher by 130% to less than 150% than the OD value of the printed matter of Comparative Example 1.
D: the OD value was higher by 110% to less than 130% than the OD value of the printed matter of Comparative Example 1.
E: the OD value was higher by less than 110% than the OD value of the printed matter of Comparative Example 1.

4.1.2. Color Development Property of Printed Matter Including Ink 2

By using a fluorescent spectrodensitometer FD-7 (trade name, manufactured by Konica Minolta, Inc.), an optical density (OD value) of each printed matter which was the cloth to which the ink 2 was adhered was measured under conditions similar to those described above.

Subsequently, by comparison between the OD value of the printed matter of each of Examples 1 to 12 and Comparative Examples 2 to 5 and the OD value of the printed matter of Comparative Example 1, the color development property was evaluated in accordance with the following evaluation criteria. The results thereof are shown in Table 3.

A: the OD value was higher by 170% or more than the OD value of the printed matter of Comparative Example 1.
B: the OD value was higher by 150% to less than 170% than the OD value of the printed matter of Comparative Example 1.
C: the OD value was higher by 130% to less than 150% than the OD value of the printed matter of Comparative Example 1.
D: the OD value was higher by 110% to less than 130% than the OD value of the printed matter of Comparative Example 1.

E: the OD value was higher by less than 110% than the OD value of the printed matter of Comparative Example 1.

4.2. Abrasion Resistance

After being formed in accordance with the formation of the printed matter described above, the printed matter which was the cloth to which the ink 1 was adhered was left for one hour at a room temperature of 25° C. Subsequently, by using a recorded surface of the printed matter, the abrasion resistance was evaluated in accordance with JIS K5701: 2000 using a Gakusin-type rubbing fastness tester AB-301 (trade name, manufactured by Tester Sangyo Co. Ltd.). In particular, after a cotton cloth was placed on the recorded surface and then rubbed with a load of 400 g, peeling of the recorded surface and the ink transfer to the cotton cloth were confirmed by visual inspection, and the abrasion resistance was evaluated in accordance with the following criteria. The results thereof are shown in Table 3.

A: Neither color transfer nor peeling was confirmed.
B: Color transfer and peeling were slightly confirmed.
C: Color transfer and peeling were apparently confirmed.

4.3. Water Resistance

After being formed in accordance with the formation of the printed matter described above, the printed matter which was the cloth to which the ink 1 was adhered was immersed in cold water at 20° C. for five minutes. Subsequently, water was squeezed out, and the printed matter was spontaneously dried. Discoloration and staining of the printed matter thus dried were confirmed by visual inspection, and the water resistance was evaluated in accordance with the following criteria. The results thereof are shown in Table 3.

A: Neither discoloration nor staining was confirmed.
B: discoloration and staining were slightly confirmed.
C: discoloration and staining were apparently confirmed.

4.4. Texture

After the printed matter was formed in accordance with the formation of the printed matter described above, the texture of the printed matter which was the cloth to which the ink 1 was adhered was evaluated by a sensory test. In particular, arbitrarily selected five judgers evaluated whether the printed matter thus obtained had approximately the same hand feeling as that of the original cloth or had a stiff touch due to degradation of the hand feeling of the original cloth, and based on the results thus obtained, the texture was evaluated in accordance with the following criteria. The evaluation results thereof are shown in Table 3.

A: the number of judgers who evaluated the printed matter to have "approximately the same hand feeling as that of the original cloth" was four or more.
B: the number of judgers who evaluated the printed matter to have "approximately the same hand feeling as that of the original cloth" was three.
C: the number of judgers who evaluated the printed matter to have "approximately the same hand feeling as that of the original cloth" was one or two.
D: the number of judgers who evaluated the printed matter to have "a stiff touch due to degradation of the hand feeling of the original cloth" was five.

4.5. Degree of Yellowing of Cloth

In accordance with the formation of the printed matter described above, the printed matter which was the cloth to which the ink 1 was adhered was formed. A white area of the printed matter thus obtained to which the ink was not adhered was confirmed by visual inspection, and the degree of yellowing of the cloth was evaluated in accordance with the following criteria. The results thereof are shown in Table 3.

A: No yellowing was confirmed.
B: Yellowing was slightly confirmed.
C: Yellowing was apparently confirmed.

TABLE 3

| | | EXAMPLE 1 | EXAMPLE 2 | EXAMPLE 3 | EXAMPLE 4 | EXAMPLE 5 | EXAMPLE 6 |
|---|---|---|---|---|---|---|---|
| EVALUATION RESULT | COLOR DEVELOPMENT PROPERTY of PRINTED MATTER INCLUDING INK 1 | A | A | A | A | A | A |
| | COLOR DEVELOPMENT PROPERTY of PRINTED MATTER INCLUDING INK 2 | A | A | A | B | A | A |
| | ABRASION RESISTANCE | A | A | A | A | A | A |
| | WATER RESISTANCE | A | A | A | A | A | A |
| | TEXTURE | A | A | A | A | A | A |
| | DEGREE OF YELLOWING OF CLOTH | A | B | A | A | B | A |

| | | EXAMPLE 7 | EXAMPLE 8 | EXAMPLE 9 | EXAMPLE 10 | EXAMPLE 11 | EXAMPLE 12 | COMPARATIVE EXAMPLE 1 |
|---|---|---|---|---|---|---|---|---|
| EVALUATION RESULT | COLOR DEVELOPMENT PROPERTY of PRINTED MATTER INCLUDING INK 1 | A | A | A | A | A | A | E |

TABLE 3-continued

| | | | | | | | | |
|---|---|---|---|---|---|---|---|---|
| COLOR DEVELOPMENT PROPERTY of PRINTED MATTER INCLUDING INK 2 | B | B | A | A | A | B | E | |
| ABRASION RESISTANCE | A | A | A | A | A | A | B | |
| WATER RESISTANCE | A | A | A | A | A | A | C | |
| TEXTURE | A | A | A | B | C | A | A | |
| DEGREE OF YELLOWING OF CLOTH | A | B | A | B | B | A | A | |

| | | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|
| EVALUATION RESULT | COLOR DEVELOPMENT PROPERTY of PRINTED MATTER INCLUDING INK 1 | D | C | C | C |
| | COLOR DEVELOPMENT PROPERTY of PRINTED MATTER INCLUDING INK 2 | C | B | B | B |
| | ABRASION RESISTANCE | B | A | A | A |
| | WATER RESISTANCE | B | A | A | A |
| | TEXTURE | A | A | A | A |
| | DEGREE OF YELLOWING OF CLOTH | A | A | A | A |

As shown in Table 3, it was found that when the treatment liquid composition of this embodiment is adhered to the cotton cloth containing fibers which has hydroxy groups, and printing is performed on the cotton cloth to which the treatment liquid composition is adhered, a printed matter having sufficient color development property and fastness, such as the abrasion resistance and the water resistance, can be easily obtained.

From the comparison between Examples 5 and 11, it was found that when a treatment liquid composition which contains 25.0 percent by mass or less of the compound including a polyvalent carbodiimide group with respect to the total mass of the treatment liquid composition is used, a printed matter having, besides sufficient color development property and fastness, a preferable texture can be obtained.

From the comparison between Examples 5 and 10, it was found that a treatment liquid composition which contains 15.0 percent by mass or less of the compound including a polyvalent carbodiimide group with respect to the total mass of the treatment liquid composition is used, a printed matter having, besides sufficient color development property and fastness, a more excellent texture can be obtained.

From the comparison of Examples 1 and 3 with Example 2; Examples 4 and 6 with Example 5; and Examples 7 and 9 with Example 8, it was found that when a treatment liquid composition in which a content ratio of the compound including a polyvalent carbodiimide group to the aromatic carboxylate salt (the compound including a polyvalent carbodiimide group: the aromatic carboxylate salt) is 1:1 to 1:9 in a mass ratio is used, a printed matter having, besides sufficient color development property and fastness, a preferable texture can be obtained, and this printed matter is further less likely to be yellowed.

From the comparison between Examples 8 and Example 12, it was found that when a treatment liquid composition containing a malic acid as the organic solvent is used, a printed matter which is less likely to be yellowed can be obtained.

What is claimed is:

1. A printing treatment liquid composition to be adhered to a cloth, the composition comprising:
   a compound including a polyvalent carbodiimide group which has a carbodiimide group equivalent of 500 g/mol or less; and
   an aromatic carboxylic acid and/or its salt,
   wherein a content of the compound including a polyvalent carbodiimide group with respect to a total mass of the treatment liquid composition is 1.0 to 35.0 percent by mass, a content of the aromatic carboxylic acid and/or its salt with respect to the total mass of the treatment liquid composition is 0.1 to 30.0 percent by mass, and the cloth contains fibers having hydroxy groups.

2. The treatment liquid composition according to claim 1, wherein the aromatic carboxylic acid and/or its salt includes at least one selected from the group consisting of benzoic acid, 1-naphthalene carboxylic acid, 2-naphthalene carboxylic acid, sulfoisophthalic acid, a benzoate salt, a 1-naphthalene carboxylate salt, a 2-naphthalene carboxylate salt, and a sulfoisophthalate salt.

3. The treatment liquid composition according to claim 1, wherein a content ratio of the compound including a polyvalent carbodiimide group to the aromatic carboxylic acid and/or its salt in a mass ratio is 1:9 to 9:1.

4. The treatment liquid composition according to claim 1, further comprising:
an organic acid different from the aromatic carboxylic acid.

5. An ink jet printing ink set comprising:
the treatment liquid composition according to claim 1; and
an ink jet printing ink composition,
wherein the ink composition contains a colorant and water.

6. The ink jet printing ink set according to claim 5, wherein the colorant is a disperse dye.

7. The ink jet printing ink set according to claim 5, wherein the colorant is a cyan dye.

8. A printing method comprising:
a treatment liquid composition adhesion step of adhering the treatment liquid composition according to claim 1 to the cloth.

9. An ink jet printing method comprising:

a treatment liquid composition adhesion step of adhering the treatment liquid composition of the ink set according to claim 5 to the cloth;

an ejection step of ejecting the ink composition of the ink set according to claim 5 from a recording head so as to be adhered to an intermediate transfer medium; and a transfer step of transferring the ink composition adhered to the intermediate transfer medium to the cloth to which the treatment liquid composition is adhered.

10. An ink jet printing method comprising:

a treatment liquid composition adhesion step of adhering the treatment liquid composition of the ink set according to claim 5 to the cloth; and an ink composition adhesion step of ejecting the ink composition of the ink set according to claim 5 from a recording head so as to be adhered to the cloth to which the treatment liquid composition is adhered.

\* \* \* \* \*